United States Patent [19]

Petersen et al.

[11] Patent Number: 5,761,237
[45] Date of Patent: Jun. 2, 1998

[54] METHOD AND APPARATUS FOR MULTIUSER-INTERFERENCE REDUCTION

[75] Inventors: Brent R. Petersen, Calgary, Canada; Eleftheriou Evangelos, Zurich, Switzerland

[73] Assignee: International Business Machines Corporation, Armonk, N.Y.

[21] Appl. No.: 666,457

[22] PCT Filed: Feb. 10, 1994

[86] PCT No.: PCT/EP94/00374

§ 371 Date: Jun. 27, 1996

§ 102(e) Date: Jun. 27, 1996

[87] PCT Pub. No.: WO95/22209

PCT Pub. Date: Aug. 17, 1995

[51] Int. Cl.[6] .............. H04B 1/69; H04B 1/10; H04J 13/02
[52] U.S. Cl. .............. 375/200; 375/233; 375/350; 370/479; 364/724.2
[58] Field of Search .............. 375/200, 206, 375/207, 229, 230, 232, 233, 234, 348, 350; 370/320, 335, 342, 441, 479; 364/724.2

[56] References Cited

U.S. PATENT DOCUMENTS

| | | | |
|---|---|---|---|
| 3,614,623 | 10/1971 | McAuliffe | 375/261 |
| 3,875,515 | 4/1975 | Stuart et al. | 375/348 |
| 4,914,699 | 4/1990 | Dunn et al. | 375/202 |
| 5,031,195 | 7/1991 | Chevillat et al. | 364/724.2 |
| 5,142,552 | 8/1992 | Tzeng et al. | 364/724.19 |
| 5,377,266 | 12/1994 | Davis | 375/206 |
| 5,394,434 | 2/1995 | Kawabe et al. | 375/200 |

FOREIGN PATENT DOCUMENTS 0534489  3/1993  European Pat. Off. .

OTHER PUBLICATIONS

P.N. Monogioudis et al., "Performance of Adaptive Nonlinear NEFAR CDMA Reciever Architecture," Electronics Letters, vol. 30, No. 3, pp. 192–193, Feb. 3, 1994.

A. Klein et al., "Linear Unbiased Data Estimation in Mobile Radio Systems Applying CDMA," IEEE Jour. on Sel. Areas in Communications, vol. 11, No. 7, pp. 1058–1066, Sep. 1993.

S. Vasudevan et al., "Receivers for CDMA Communication over Time–Varying Rayleigh Fading Channels," 1993 IEEE Global Telecommunications Conf., pp. 60–64, 1993.

Primary Examiner—Stephen Chin
Assistant Examiner—Jeffrey W. Gluck
Attorney, Agent, or Firm—John D. Flynn

[57] ABSTRACT

The present invention concerns an apparatus and method for reducing the multiuser-interference of input signals. The apparatus in accordance with the present invention comprises a multivariate predictor (81) and a decision quantizer (82), said multivariate predictor (81) operating on interference signals $\eta'(D)$ provided by means for extracting interference signals (83), said interference signals $\eta'(D)$ being obtained from said input signals and output signals $\hat{b}(D)$ which are available at an output of said decision quantizer (82) and fed back from there to said means for extracting interference signals (83).

12 Claims, 7 Drawing Sheets

METHOD AND APPARATUS FOR MULTIUSER-INTERFERENCE REDUCTION

TECHNICAL FIELD

The present invention relates to a method and apparatus for reducing multiuser-interference in Code Division Multiple Access (CDMA) multi-channel communication systems, and in particular, in CDMA cellular radio communication systems. The present invention is also applicable in CDMA Infra Red (IR) networks.

BACKGROUND OF THE INVENTION

Wireless communication systems, in particular cellular radio telephone communication systems and diffused infrared (IR) systems, become more and more important because they increase mobility and offer wireless connectivity to telephone and computer users almost everywhere. While the latter ones are usually deployed indoors, e.g., for the interconnection of computers and servers, the cellular radio communication systems, e.g., the analog AMP systems in the US and the digital GSM system in Europe, facilitate mobile communication and data exchange in almost all metropolitan areas. It is expected that the emerging Personal Communications Networks (PCN) will encompass a wider range of communications capabilities than those represented by current analog or digital cellular mobile radio technology. High traffic capacity and low power consumption are two important issues in the emerging new cellular systems.

Currently, channel access in cellular radio telephone communication systems is achieved by using Frequency Division Multiple Access (FDMA) and Time Division Multiple Access (TDMA) methods. In FDMA-based systems, the capacity is limited by the number of available frequency subbands, whereas the capacity of TDMA systems is limited by the number of slots per frame carrying the transmitted signals.

In contrast, Code Division Multiple Access (CDMA) allows signals to overlap in both frequency and time. Thus, all CDMA signals share the same frequency spectrum. In either time or frequency domain, the multiple access signals appear to be on top of each other. A CDMA-based communications system model is illustrated in FIG. 4. The data stream of the $k^{th}$ user $\{b_k(n)\}$, e.g. speech or data, to be transmitted is modulated by a user specific signal $s_k(t)$. Each signal $s_k(t)$ corresponds to a unique spreading code $c_k$. A plurality of spread spectrum signals is modulated and transmitted on a radio frequency (RF) carrier wave. At the receiver, the composite signal r(t) is demodulated and correlated with a selected spreading code $c_k$. The correlation by the user specific spreading code isolates and decodes the corresponding data signal.

There are a number of advantages associated with the CDMA technology. The capacity of CDMA-based systems is projected to be several times higher than that of existing analog FDMA systems. In addition, CDMA is resistant to multi-path interference and fading. Furthermore, the scrambled format of CDMA signals makes it difficult and costly to eavesdrop or track calls, insuring greater privacy for users and providing greater immunity from air time fraud.

Conventional CDMA systems are multiuser-interference limited, whereas the above described TDMA and FDMA systems are primarily bandwidth limited. Thus, in practical implementations of CDMA, capacity is directly related to the signal-to-interference (S/I) ratio, which is essentially a measure of the multiuser interference, caused by other overlapping signals. The problem to be solved, therefore, is how to further increase system capacity and still be able to maintain a reasonable S/I ratio so that signal decoding can be carried out efficiently and accurately.

Conventional code-division multiple-access cellular and microcellular wireless systems use long spreading codes, i.e., sequences whose period is much longer than the data symbol duration, employ complex powerful convolutional codes to mitigate the effect of multiuser interference, and rely on power control strategies to remedy the "near-far problem". However, as the number of simultaneous transmissions in a system of fixed bandwidth increases, or as the relative power levels of the different user signals become disparate (near-far problems), a high performance penalty is observed. The sensitivity of these systems to the multiuser interference and to the "near-far problem" can substantially reduce the capacity of the overall system. The "near-far problem" is more critical on the asynchronous uplink, i.e., the communication from a mobile station (MS) to a base station (BS), where the different user signals could arrive with different power levels. In contrast, on the synchronous downlink, from a BS to a MS, the multiuser interference is primarily due to simultaneous transmissions by neighboring base stations.

Some conventional CDMA systems, in particular the receivers therein that are relevant in the present context, are described below. The performance limitations of a conventional asynchronous CDMA system have been discussed by M. B. Pursley in the article "Performance Evaluation for Phase-Coded Spread Spectrum Multiple-Access Communication- Part I: System Analysis", IEEE Transactions on Communications, Vol. COM-25, pp. 795–799, August 1977.

The optimum multiuser receiver consisting of a bank of matched filters followed by a Viterbi detector which performs joint maximum likelihood sequence estimation (MLSE) has been considered in "Minimum probability of error for asynchronous Gaussian multiple access channels", by S. Verdú, IEEE Transactions on Information Theory, Vol. IT-32, pp. 85–96, January 1986.

Suboptimum linear multiuser decorrelating detectors for a synchronous or asynchronous CDMA system have been presented in "Linear multiuser detectors for synchronous code-division multiple access channels", R. Lupas and S. Verdú, IEEE Transactions on Information Theory, Vol. IT-35, pp. 123–136, January 1989. These suboptimum detectors are essentially zero-forcing (ZF) multiple-input/multiple-output linear equalizers, i.e., multiple-input/multiple-output linear filters that minimize multiuser interference using the ZF criterion. They are also known as ZF multiuser equalizers. It is shown that the decorrelating detector is near-far resistant. Furthermore, it is pointed out by R. Lupas and S. Verdú in the above article that the decorrelating detector or multiuser ZF equalizer requires knowledge of the spreading codes of all users, but no explicit knowledge of the relative received signal powers.

A conventional multivariate decision-feedback equalizer (MDFE), which requires knowledge of the spreading codes of all users, has been disclosed in "Equalizers for multiple input/multiple output channels and PAM systems with cyclostationary input sequences", A. Duel-Hallen, IEEE Journal on Selected Areas in Communications, Vol. 10, No. 3, pp. 630–639, April 1992. A noise-predictive decision-feedback equalizer (NP-DFE) has been proposed in "Decision feedback equalization", C. A. Belfiore and J. H. Park, Jr., Proc. IEEE, Vol. 67, No. 8, pp. 1143–1156, August 1979.

However, the latter structure has been derived for only the case of a single-variable, meaning the data of only one user, corrupted by intersymbol-interference (ISI) and additive noise, is detected. Such a structure is not suitable for a CDMA system.

The use of an adaptive fractional-chip spaced decision-feedback equalizer (DFE) in a CDMA system has been discussed in "Equalization for interference suppression in spread spectrum multiple access systems", M. Abdulrahman, D. D. Falconer, and A. U. H. Sheikh, in Conference Records IEEE VTC 92, Vol. 1, (Denver, Colo.), pp. 1–4, May 1992. It was demonstrated that a single-input/single-output adaptive DFE placed in an MS receiver can mitigate the effects of multiuser interference, can perform RAKE (RAKE is a code name for a receiver being described in "Digital Communications" by J. G. Proakis, McGraw-Hill Book Company, 1983) combining of multipath components, and also that it does not require explicit knowledge of the interferers' spreading code. The feedback section of the DFE is using past decisions from a single user and thus cannot further compensate for multiuser-interference. In such a configuration the feedback section eliminates only ISI (intersymbol interference).

Another CDMA system proposal is based on the technique of detection and subtraction of interferers' signals in user order, also known as interference cancellation (IC). This CDMA system proposal is disclosed in "CDMA using interference cancellation", M. Ewerbring, G. Larsson, and P. Teder, CEC Deliverable R2020/PKI/RI/DS/I/005/b1 (W. Granzow, ed.), pp. 141–163, 1992. Many properties of this CDMA system proposal, however, include the fact that knowledge of the users' spreading code is essential.

In U.S. Pat. No. 5,136,612, entitled "Method and Apparatus for Reducing Effects of Multiple Access Interference in a Radio Receiver in a Code Division Multiple Access Communication System", another CDMA scheme is disclosed. The channel capacity is increased, in accordance with this US patent, by reduction of the effects of the multiple access interference, also referred to as multiuser interference. The reception of CDMA radio transmissions is in multiple stages, and the multiple access interference is estimated after the first stage. This multiple access interference is then subtracted from the original, received input, and the detection of the intended signal is performed on the signal having the reduced multiple access interference.

A slightly different approach is known from U.S. Pat. No. 5,218,619, entitled "CDMA Subtractive Demodulation". According to this approach, the received information signal, i.e., the composite signal, after each information signal has been successfully decoded, is recoded and then removed from the composite signal. The CDMA demodulation is enhanced by decoding the composite signal in the order of strongest to weakest signal strength. The common principle of the latter two US patents is illustrated in FIG. 1, which shows a schematic CDMA receiver. As shown in this Figure, the composite signal r(t) is fed to a despreader (DS) 10, where the spreading codes used at the transmitter site are employed in order to decode the respective information signals. These information signals are then forwarded to a decision quantizer (Q) 11. The detected signals are classified into those that are most likely correct and those that are likely not to be correct. The detection process is then repeated. From the decoded data signal $\hat{b}$ (n) the ones that are most likely correct are fed back to the spreading circuitry (S) 12 where they are recoded (spread) using the corresponding spreading codes. The regenerated spread waveforms are subtracted from the original received signal r(t) to remove part of the multiuser interference. Thus the outputs which initially were classified as being not correct are re-detected in a second stage.

The underlying concept of the structure described in the article of A. Duel-Hallen is shown in FIG. 2A. It consists of a multiple-input/multiple-output forward filter 17 and a multiple-input/multiple-output feedback filter 14. The detected data vector $\hat{b}$ (n)=($\hat{b}_1$(n), ..., $\hat{b}_K$(n)), representing decisions for all K users, is provided at the output of a decision quantizer 13 is filtered by the multiple-input/multiple-output feedback filter (FBF) 14. From there it is fed back to the quantizer's input to reduce multiuser-interference.

The underlying concept of the system described by M. Abdulrahman et al. is shown in FIG. 2B. The detected data symbols of a particular user $\hat{b}_k$(n), i.e. the symbols at the output of the decision quantizer 15, are fed back via a single-input/single-output feedback filter 16. Note that the feedback section can mitigate only ISI and not multiuser-interference.

The "near-far" problem and the multiuser-interference are still the main impediments towards higher capacity

SUMMARY OF THE INVENTION

It is an object of the present invention to provide a novel structure and method for mitigating the effects of interference due to simultaneous transmissions in a CDMA system without requiring explicit knowledge of the spreading codes of the different users.

It is another object of the present invention to provide a novel structure and method for reducing the multiuser interference without requiring explicit knowledge of the relative received power levels of the different users, i.e., a structure and method which is insensitive to the "near-far" problem.

The above objects have been accomplished by making use of a novel scheme for reducing the multiuser interference.

The multivariate noise-predictive decision-feedback equalizer (MNP-DFE) in accordance with the present invention has the following advantages:

1. The derivation of the multivariate predictor coefficients is decoupled from the derivation of the forward multiuser equalizer coefficients.

2. The multivariate predictor can operate on the output of any bank of linear filters, adaptive or fixed, such as fixed despreaders.

3. An MNP-DFE can easily be combined with soft decision convolutional coding.

4. The forward linear multiuser equalizer and the multivariate predictor of an MNP-DFE optimized under the MMSE (minimum mean squared error criterion) lend themselves to simple adaptive implementations by using the LMS algorithm. The forward linear multiuser equalizer and the multivariate predictor are then updated separately.

5. The forward linear multiuser equalizer of an MNP-DFE configuration can be implemented as a bank of despreaders followed by a matrix of K×K, T-spaced equalizers, or as a bank of K fractional-chip spaced equalizers, where K is the number of simultaneous users.

DESCRIPTION OF THE DRAWINGS AND NOTATIONS USED

The invention is described in detail below with reference to the following drawings.

Figure 10A:
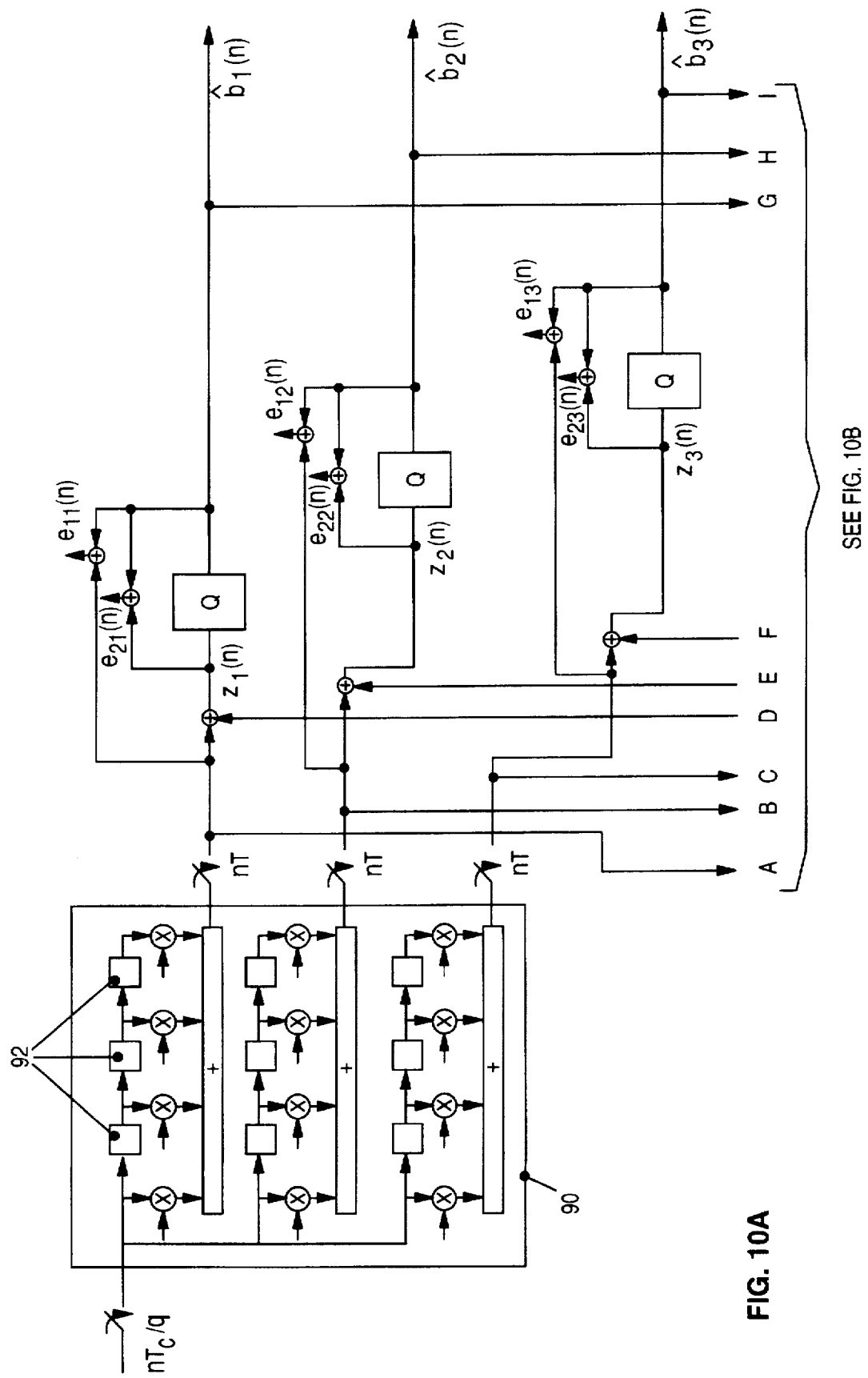

FIG. 10A, B show a schematic block diagram of an MNP-DFE, in accordance with the present invention, designed for three users.

Figure 11:
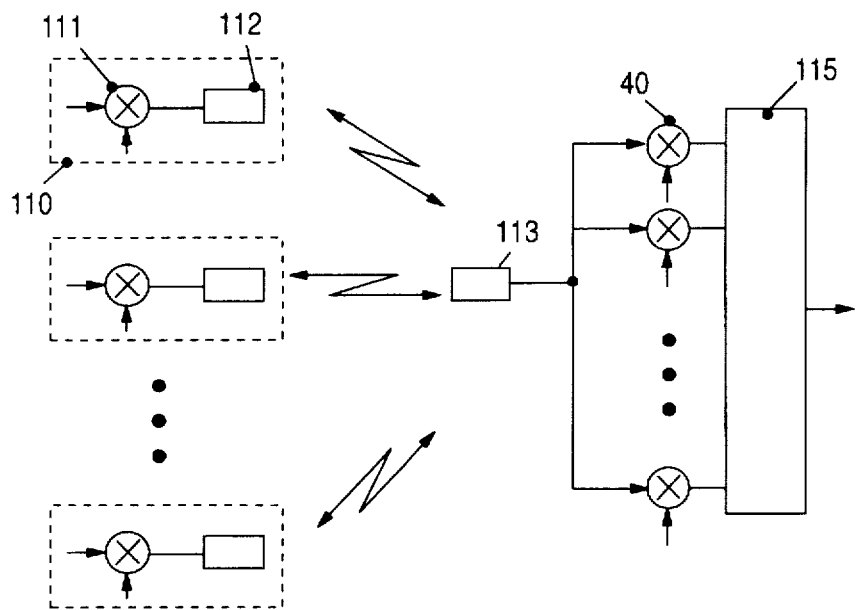

FIG. 11 shows a schematic block diagram of a CDMA infrared network in accordance with the present invention.

DESCRIPTION OF VARIABLES $b_k(n)$ data symbol of $k^{th}$ user at time n $\{b_k(n)\}$ discrete-time data-symbol sequence of $k^{th}$ user $\underline{b}(n)$ K×1 data-symbol vector, i.e., $\underline{b}(n)=(b_1(n), \ldots , b_K(n))$ $\{\underline{b}(n)\}$ discrete-time data-symbol vector sequence $s_k(t)$ signature waveform of $k^{th}$ user $\underline{c}_k = \{c_k^I\}_{I=0}^{N-1}$ spreading code of $k^{th}$ user corresponding to signature waveform $S_k(t)$ $w_k$ attenuation level of $k^{th}$ user $y_k(n)$ matched-filter output of $k^{th}$ user at time n $\{y_k(n)\}$ discrete-time matched-filter output sequence of $k^{th}$ user $\underline{y}(n)$ K×1 matched-filter output vector, i.e., $\underline{y}(n)=(y_1(n), \ldots , y_K(n))$ $\{\underline{y}(n)\}$ discrete-time matched-filter output vector sequence $r_{kl}(i)$ $kl^{th}$ element of matrix R(i), i=−1, 0, 1

$R_\eta(i)$ autocorrelation matrix of vector $\underline{\eta}(n)$ $S_\eta(D)$ spectrum of discrete-time vector $\underline{\eta}(n)$ S(D) transfer function matrix of the equivalent multiple-input/multiple-output channel output C(D) transfer function matrix of the multiple-input/multiple-output equalizer P(D) transfer function matrix of the multiple-input/multiple-output (multivariate) predictor $S_\epsilon(D)$ spectrum of discrete-time prediction error vector $\underline{e}(n)$

DETAILED DESCRIPTION

Communications System Model

Figure 1:
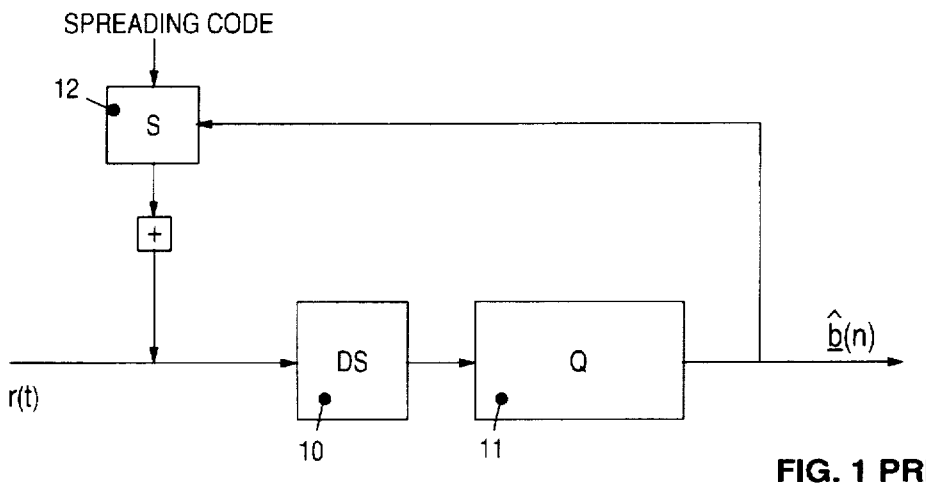
FIG. 1 shows a schematic block diagram of a CDMA receiver known in the art.
Figure 2A:
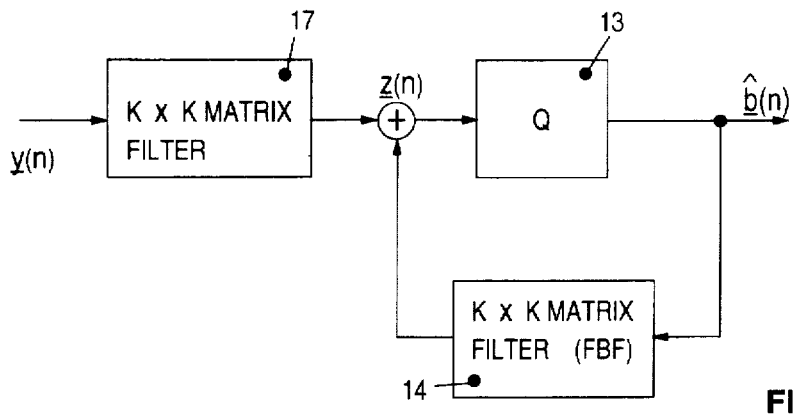
FIG. 2A shows a schematic block diagram of another CDMA system described by Duel-Hallen.
Figure 2B:
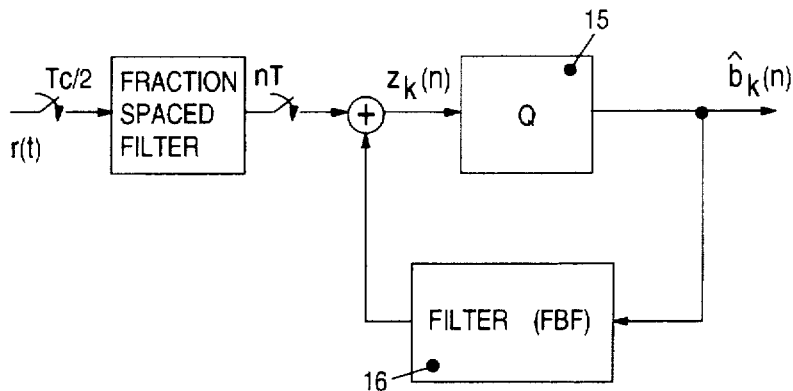
FIG. 2B shows a schematic block diagram of another CDMA system described by M. Abdulrahman et al.
Figure 3:
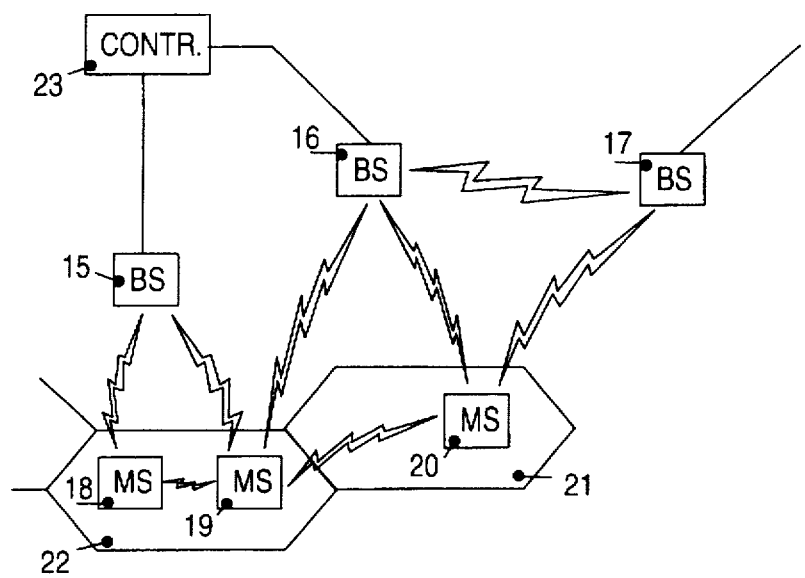
FIG. 3 shows a cellular communications system.

A cellular system composed of cells 21 and 22, base stations (BS) 15–17, and mobile stations (MS) 18–20, is shown in FIG. 3. As illustrated, two of the BSs are connected to a common radio network controller 23, whereas a third BS 17 is operated by a non co-operating operator (not shown). For a CDMA system, isolation among cells is achieved largely by spreading codes and distance, and somewhat by frequency and time. However, isolation among cells is not ideal, and causes intra- and inter-cell interference. Furthermore, the existence of cooperating or non-cooperating multiple operators in the same geographical area worsens the problem of multiuser interference.

Inter-cell interference can arise from:

multiuser interference from non-cooperating operators, such as interference from BS 17 to BS 16 and to MS 20 (if BS 17 belongs to a non-cooperating operator);

multiuser interference from cooperating cellular systems;

multiuser interference from different cells of the same cellular system, such as between MS 19 and BS 16. Even though MS 19 and BS 16 may desire to communicate, such as during some form of handover to a new cell, the signal from MS 19 may cause interference at BS 16 when BS 16 detects the signal from MS 20.

Intra-cell interference can arise from:

multiuser interference within a cell of some cellular system, such as at BS 15. For example, BS 15 must detect the signal from MS 18, which is corrupted by the signal from MS 19. BS 15 must also detect the signal from MS 19, which is corrupted by the signal from MS 18.

Figure 4:
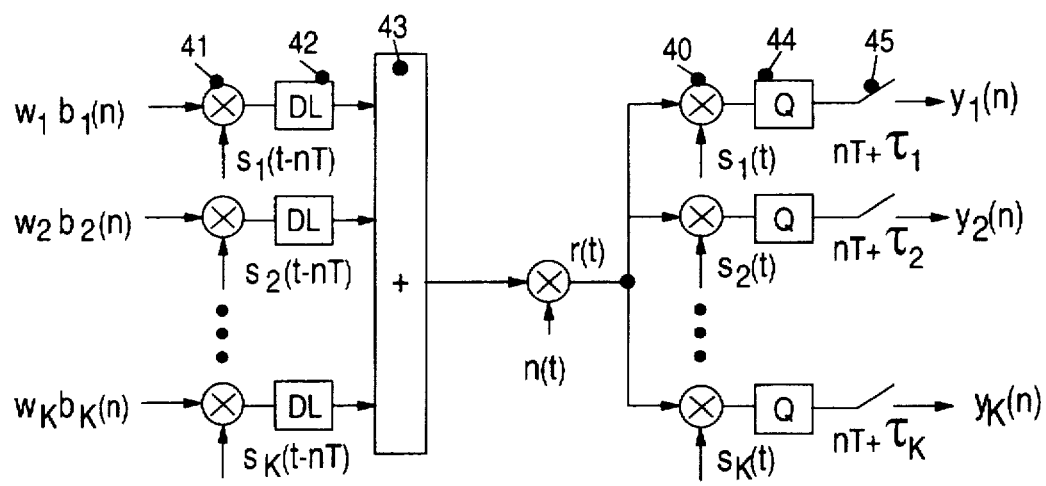
FIG. 4 shows a DS/CDMA (direct-sequence Code Division Multiple Access) communications system.

FIG. 4 shows a general block diagram of a direct-sequence CDMA (DS/CDMA) communications system model. In this model, a common additive white Gaussian noise (AWGN) channel is shared by synchronous or asynchronous users (1,2, . . . ,K) whose transmitted power is attenuated by different values. Without loss of generality, the attenuation levels $w_1, w_2, \ldots , w_K$ have been lumped together with the corresponding data symbols $b_1(n), \ldots , b_K(n)$. Furthermore, the existence of despreading circuitry 40, 44, 45 at the receiver side has been assumed. This despreading circuitry comprises a despreader 40 and integrate and dump units 44, 45. The transmitter of each user consists basically of a spreading and modulation unit 41. For transmitters located in mobile stations (MS) the delay units 42 represent the relative delay $(\tau_1, \ldots , \tau_K)$ in transmission among the different MS users. The summation unit 43 then indicates the process of superposition of signals when transmitted through the physical medium. On the other hand, if the transmitters are located in the base station (BS), then there is no relative delay between the different users and the corresponding units 42 can be eliminated. In this case, the summation unit 43 is a part of the BS transmitter.

The data sequence $\{b_k(n)\}$ of the $k^{th}$ user is represented by the D-transform $$b_k(D) = \sum_n b_k(n)D^n, \quad (1)$$

where k=1,2, . . . ,K and n is an integer. In vector notation $$\underline{b}(n)=(b_1(n), b_2(n), \ldots , b_K(n)) \quad (2)$$

represents the data sequence vector and $\underline{b}(D)$ the corresponding D-transform. The symbols are transmitted at rate 1/T, are uncorrelated, and have an average energy of unity. To each user corresponds a signature waveform $$s_k(t) = \sum_{i=0}^{N-1} c_k^i p_c(t - iT_c) \quad 1 \le k \le K, \quad (3)$$

where $p_c(t)$ is the chip pulse shape, $N=T/T_c$ is the spreading factor, and $\underline{c}_k^1 = \{c_k\epsilon(-1,1)\}_{i=0}^{N-1}$ is the spreading code of the $k^{th}$ user.

Usually, the spreading function at the transmitter of a BS or MS terminal is performed by multiplying the transmitted data sequence $\{b_k(n)\}$ with the signature waveform $s_k(t)$. An alternative implementation of the spreader 41 (and despreader 40) is by making the spreading code the impulse response of a filter. Therefore, the transmitted spread signal is the result of a convolution operation as opposed to a multiplication operation. The advantage of the latter approach is that it allows for spreading codes which are longer (or shorter) than one symbol period, while maintaining time-invariant properties of the multiuser equalizers involved at the receiver. For the sake of notational simplicity, spreading via multiplication, as illustrated in FIG. 4, has been assumed in the following.

The receiver observes the superposition $\underline{r}(n)$ of the K user signals in the presence of additional white Gaussian noise $\eta(t)$ (AWGN) with variance $\sigma^2$, i.e., $$r(t) = \sum_{n=-\infty}^{\infty} \sum_{k=1}^{K} w_k b_k(n) s_k(t - nT - \tau_k) + \eta(t) \quad (4)$$

where $w_k^2$ denotes the received power of the $k^{th}$ user and $0 \leq \tau_1, \tau_2 \ldots \tau_K \leq T$ represent the relative time delays.

After matched filtering (by means of 40, 44, and 45) and symbol-rate sampling at the samplers 45, the set of sufficient statistics $\{\underline{y}(n)\}$ are obtained, where $$\underline{y}(n) = (y_1(n), y_2(n), \ldots, y_K(n)), \quad (5)$$

and $$y_k(n) = \int r(t) s_k(t - nT - \tau_k) dt \quad 1 \leq k \leq K \quad (6)$$

denotes the output of the $k^{th}$ matched-filter. In vector notation the matched-filter outputs can be written as $$\underline{y}(n) = R(1)W\underline{b}(n-1) + R(0)W\underline{b}(n) + R(-1)W\underline{b}(n+1) + \underline{n}(n) \quad (7)$$

(See also the above mentioned article "Minimum probability of error for asynchronous Gaussian multiple access channels", by S. Verdú). The essential system parameters are therefore represented by the K×K cross-correlation matrices $R(i)$, $i=-1, 0, 1$, and the diagonal matrix $W=\text{diag}(w_1, w_2, \ldots, w_K)$. The $kl^{th}$ element of $R(i)$ is computed by $$r_{kl}(i) = \int s_k(t-\tau_k) s_l(t+iT-\tau_l) dt \quad 1 \leq k, l \leq K \quad (8)$$

Note that $R(0)$ is symmetric and $R(1)$ is upper triangular with zero diagonal elements. Furthermore, $R(-1)=R(1)^T$, where T denotes the complex conjugate transpose.

It can also be shown that the autocorrelation matrix of the noise vector at the output of the matched-filters 40, 44 is given by $$R_\eta(i) = E\{\underline{n}(n+i)\underline{n}(n)^T\} = \sigma^2 R(i), \quad i=-1,0,1 \quad (9)$$

Figure 5:
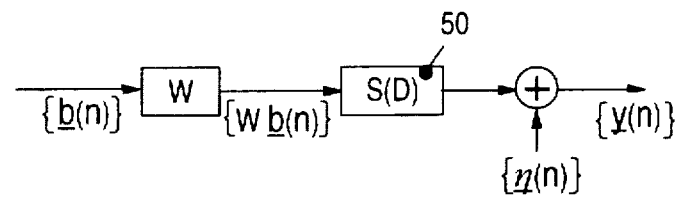
FIG. 5 shows an equivalent discrete-time multiple-input/multiple-output model.

Equations (7) and (9) give rise to an equivalent discrete-time multiple-input/multiple-output model for a CDMA system. FIG. 5 shows a block diagram of this model. Using equation (7), it can be shown that the transfer function matrix of the equivalent channel 50 is given by $$S(D) = R(1)D + R(0) + R(-1)D^{-1} \quad (10)$$

Similarly, the spectrum of the discrete-time noise vector $\underline{n}(n)$ is given by $$S_\eta(D) = \sum_i R_\eta(i) D^i = \sigma^2 S(D). \quad (11)$$

Equations (7) and (9), or equivalently (10) and (11), translate the joint detection problem of K asynchronous or synchronous CDMA users to a problem of estimating a vector sequence emerging from a multiple-input/multiple-output discrete-time channel in the presence of additive colored vector noise. It is also clear from the same equations the deterministic nature of the multiuser interference and its dependence on the auto- and cross-correlation properties of the short spreading codes. Thus, some of the equalization techniques developed for multiplexed signals over multiple-input/multiple-output channels with intersymbol interference (ISI) and crosstalk (see the already mentioned article "Equalizers for multiple input/multiple output channels and PAM systems with cyclostationary input sequences", A. Duel-Hallen, IEEE J. Select. Areas Commun., Vol. 10, No. 3, pp 630–639, April 1992, and the references therein) can in principle be applied, to solve similar problems in CDMA systems.

Figure 6:
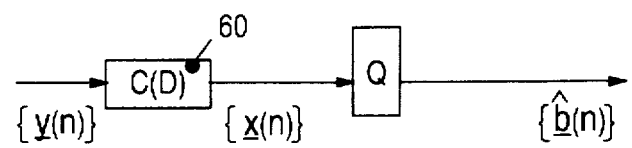
FIG. 6 shows a MMSE multiuser linear equalizer.

MMSE Linear Multiuser Equalizer:

If further processing of the matched-filter outputs $\{\underline{y}(n)\}$ is restricted to be linear, then we arrive at a linear receiver structure which takes the form of a network of K×K, T-spaced, infinite-length transversal equalizers followed by a bank of K memoryless detectors. Let $C(D)$ denote the K×K equalizer transfer matrix. The mean squared error criterion is $$E\{|\underline{x}(n) - W\underline{b}(n)|^2\}, \quad (12)$$

where $\underline{x}(n)$ denotes the output of the multiuser equalizer 60, as illustrated in FIG. 6. Applying the orthogonality principle, one obtains the transfer matrix $C(D)$ of this multiuser equalizer 60 which gives the MMSE. That is, $C(D)$ is selected such that $$E\{(\underline{x}(n+i) - W\underline{b}(n+i))\underline{y}(n)^T\} = 0 \quad \forall i \quad (13)$$

Equation (13) leads to $R_{\underline{x}\underline{y}}(i) = R_{W\underline{b}\underline{y}}(i)$, or equivalently using the cross-spectra in the D-domain $S_{\underline{x}\underline{y}}(D) = S_{W\underline{b}\underline{y}}(D)$. Hence, $$C(D)(S(D)W^2 + \sigma^2 I)S(D) = W^2 S(D) \quad (14)$$

where I represents the K×K identity matrix. Therefore, the transfer matrix $C(D)$ of the multiuser equalizer 60, based on the MMSE criterion, is $$C(D) = W^2(S(D)W^2 + \sigma^2 I)^{-1} \quad (15)$$

Figure 7:
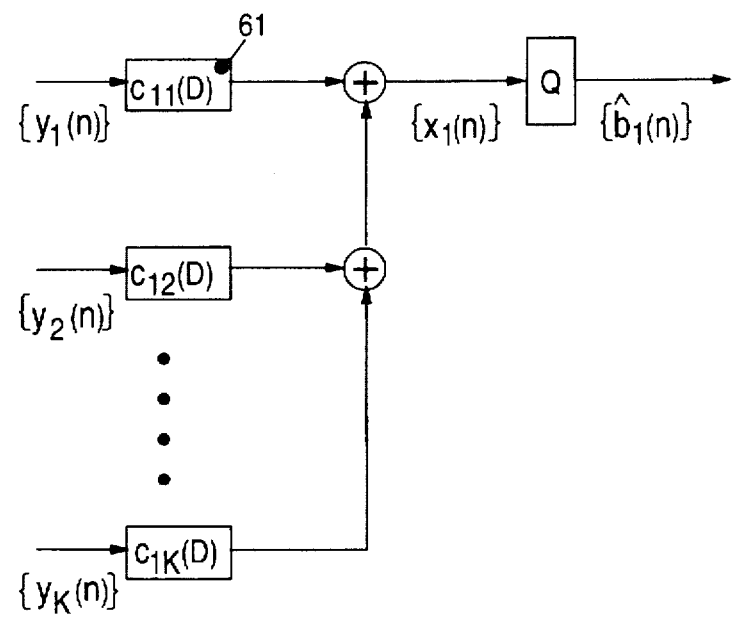
FIG. 7 shows an equalizer/detector structure for user 1.

An equalizer/detector structure, in accordance with the present invention, for the first user is shown in FIG. 7. In this case the transfer function $c_{11}(D), \ldots, c_{1K}(D)$ are the elements of the first row of the transfer matrix $C(D)$. Three units 61 of this first row are schematically shown in FIG. 7. Let $\underline{n}'(D) = \underline{x}(D) - W\underline{b}(D)$ denote the D-transform of the noise and residual interference vector at the output of the multiuser equalizer 60. Then, $$\underline{n}'(D) = (C((D)S(D) - I)W\underline{b}(D) + C(D)\underline{n}(D), \quad (16)$$

and its spectrum is given by $$S_{\underline{n}'}(D) = (C(D)S(D) - I)W^2(C(D^{-1})S(D^{-1}) - I)^T + \sigma^2 C(D)S(D)C(D^{-1})^T, \quad (17)$$

where the first term represents the spectrum of the residual interference and the second term represents the spectrum of the output noise. Using the matrix inversion lemma, it can be shown that $$S_{\underline{n}'}(D) = \sigma^2 C(D) \quad (18)$$

Thus, the MMSE of the $k^{th}$ user can be computed by simply integrating the $kk^{th}$ diagonal element of the matrix $S_{\underline{n}'}(D)$ on the unit circle, i.e., $$E\{|\eta'_k(n)|^2\} = \frac{1}{2\pi} \int_{-\pi}^{\pi} (\sigma^2 W^2(S(e^{j\omega})W^2 + \sigma^2 I)^{-1})_{kk} d\omega. \quad (19)$$

In contrast to a ZF multiuser equalizer, the relative power levels of the different users appear explicitly in the MMSE equalizer's transfer matrix C(D). Their effect on the MMSE has been studied via numerical computation. It has been found that an infinitely long MMSE multiuser equalizer is almost insensitive to the different power levels. This result demonstrates the inherent "near-far" resistance of the present MMSE multiuser linear equalizer 60.

Figure 8:
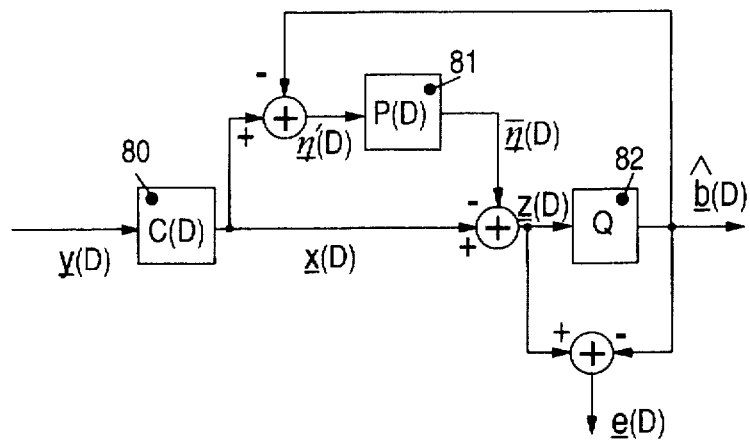
FIG. 8 shows a schematic block diagram of a multivariate noise-predictive decision-feedback equalizer, in accordance with the present invention.

MMSE Multivariate Noise-Predictive Decision Feedback Equalizer:

The MSE of the noise and residual interference vector $\underline{\eta}'(D)$ at the output of a linear multiuser equalizer can be further reduced by multivariate prediction. The idea is to use a multivariate predictor which operates as a whitening multiple-input/multiple-output filter on the vector $\underline{\eta}'(D)$. This argument motivates the multivariate noise-predictive decision-feedback equalizer structure shown in FIG. 8. It consists of a forward ZF or MMSE linear multiuser equalizer 80, as has been defined in the previous section, followed by a multivariate predictor 81. This section describes the basic principles of this approach. Let P(D) denote the general multivariate predictor K×K transfer matrix, i.e., $$P(D) = P(0) + P(1)D + P(2)D^2 + \ldots = \sum_{i=0}^{\infty} P(i)D^i, \quad (20)$$

where P(0) is a lower diagonal matrix with zero diagonal elements. Let also $\underline{\eta}(n)$ represent the multivariate predictor output vector. Then $\underline{\eta}(n) = P(D)\underline{\eta}'(n)$. Note that the $i^{th}$ component of the predictor output vector $\underline{\eta}(n)$ depends not only on the past vectors $\underline{\eta}'(n-1), \underline{\eta}'(n-2), \ldots$, but also on the present values $\eta'_{i+1}(n), \ldots, \eta'_K(n)$. Thus, the multivariate prediction process in accordance with the present invention, can be viewed as exploiting both past information and user-order. The error vector $\underline{e}(D)$ at the input of the memoryless detector 82 can be expressed as $$\underline{e}(D) = \underline{z}(D) - W\underline{b}(D) = \underline{x}(D) - \underline{\eta}(D) - W\underline{b}(D) = \underline{\eta}'(D) - \underline{\eta}(D) \quad (21)$$

thus, $$\underline{e}(D) = \underline{\eta}'(D) - P(D)\underline{\eta}'(D) \quad (22)$$

is the multivariate prediction error. The inverse spectral matrix of the wide sense stationary stochastic process $\{\underline{\eta}'(n)\}$ admits the following factorization:

$$S_{\underline{\eta}'}(D)^{-1} = H(D^{-1})^T H(D) \quad (23)$$

where, $H(D)=H(0)+H(1)D+H(2)D^2\ldots$, and H(0) is a lower triangular nonsingular matrix. Equivalently, $$S_{\underline{\eta}'}(D)^{-1} = H'(D^{-1})^T (H^d(0))^2 H'(D) \quad (24)$$

where $H^d(0)$ is a diagonal matrix whose elements are the diagonal elements of H(0) and $H'(D) = H^d(0)^{-1} H(D)$. Using equation (22), one obtains $$S_{\underline{e}}(D) = (I - P(D))S_{\underline{\eta}'}(D)(I - P(D^{-1}))^T \quad (25)$$

Therefore, the transfer matrix of the predictor 81 is given by $$P(D) = I - H^d(0)^{-1} H(D), \quad (26)$$

and the prediction error spectral matrix $$S_{\underline{e}}(D) = H^d(0)^{-2} \quad (27)$$

Thus, the MMSE at the input of the $k^{th}$ memoryless detector, i.e., the MMSE of the $k^{th}$ user, is the $kk^{th}$ diagonal element of the diagonal matrix in equation (27). The equivalence in performance of the conventional multiuser DFE and the noise-predictive multiuser DFE can be established as follows. Define $$F(D) = (I - P(D))C(D) = \frac{1}{\sigma^2} H^d(0)^{-1} H(D^{-1})^{-T}, \quad (28)$$

and $$B(D) = P(D) = I - H^d(0)^{-1} H(D). \quad (29)$$

One can easily see now that, F(D) and B(D) are the transfer matrices which define forward and feedback sections of an MDFE (see the above cited IEEE J. Select. Areas article of A. Duel-Hallen). Thus an infinite long MNP-DFE and an infinite long MDFE have the same performance. From an implementation point of view though, those two schemes are different.

Figure 9:
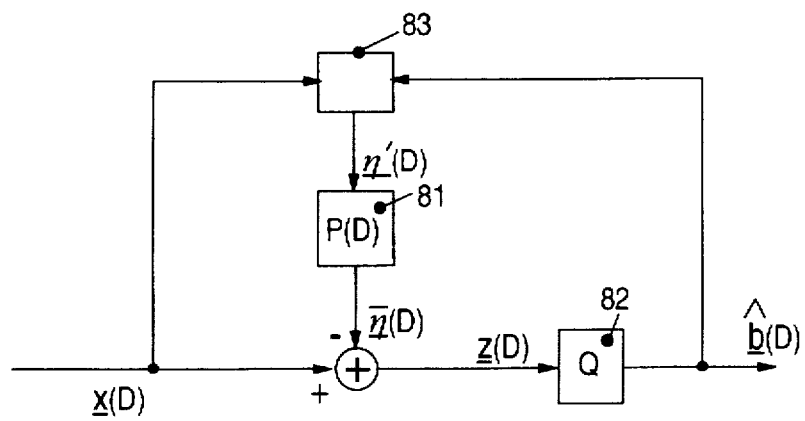
FIG. 9 shows a schematic block diagram of another multivariate noise-predictive decision-feedback equalizer, in accordance with the present invention.

FIG. 9 shows the basic principle of a multivariate predictor structure. The multiuser interference part of the signal vector $\underline{x}(D)$ is being isolated by using the decision vector $\hat{\underline{b}}$ (D). The isolation of said multiuser interference part is carried out by means for extracting interference signals 83. The multivariate predictor 81 operating both in time and user order produces an output vector $\underline{\eta}$ (D) which is as close as possible in MMSE sense to the multiuser interference vector $\underline{\eta}'(D)$. Subtracting the multivariate predictor output $\underline{\eta}'(D)$ from the input vector $\underline{x}(D)$ results in a minimization of the multiuser interference at the input of the quantizer 82. Details of the multivariate prediction theory are given in the two papers of N. Wiener and P. Masani, published in: Acta Math., Vol. 98, pp. 112–150, November 1957, and Acta Math., Vol. 99, pp. 93–137, April 1958.

CDMA System Design Considerations:

In the following section some general aspects of the present CDMA system are discussed. In practical applications the MMSE multiuser linear equalizer and multivariate predictor have finite lengths. For finite lengths and known cross-correlation matrices, the coefficients of the multiuser equalizer can be obtained by simply solving a set of linear equations. In the case of a multiuser noise-predictive decision feedback equalizer the solution begins by obtaining first the coefficients of the forward linear multiuser equalizer. The coefficients of the multivariate predictor are then the solution of a set of generalized normal equations. Adaptive equalizers have the property of converging dynamically to the correct set of coefficients without explicitly solving a system of equations.

Note that the implementation of the equalizers—and embodiments of the present invention—do not depend on whether transmission to and from the base station is asynchronous or synchronous. Synchronous transmission will improve the orthogonality properties of the spreading codes and will marginally improve the performance of a multiuser equalizer.

The linear MMSE multiuser equalizer, in accordance with the present invention, can be implemented as a network of, K×K, T-spaced equalizers, or as a bank of K fractional-chip spaced equalizers. In the latter case, there is no need to explicitly implement the despreading function separately. The fractional-chip spaced equalizer has the property of synthesizing both the despreading and the equalizing functions. The practical advantage of MMSE equalizers is that they lend themselves to simple adaptive implementation. Thus, for a fading channel and unknown cross-correlation functions, standard adaptation algorithms can be applied. The adaptation algorithms can operate in reference-directed or decision-directed mode. In environments where the channel changes very slowly relative to the symbol rate, it will be easier for the equalizer to track the variations. In rapidly changing environments, additional techniques such as channel sounding may be necessary. However, note that a multiuser equalizer does not invert the channel frequency response but rather the spectrum of the correlation matrices which are formed from the different spreading codes. Hence, in this regard the tracking problem of a multiuser equalizer should be in general easier than the tracking problem of a conventional single-input single-output equalizer over a fast-fading frequency selective channel.

One of the major practical advantages of the present multiuser noise-predictive decision feedback equalizer is that the adaptation of the forward linear multiuser equalizer is decoupled from that of the multivariate predictor. As a consequence, the multivariate predictor can always be disconnected or connected without affecting the normal operation of the system. For example, it may be desirable to disconnect completely the multivariate prediction operation if high error propagation due to feedback in a fast fading situation is observed. On the other hand, in a heavy shadowing situation applying partial multivariate noise prediction on users with relatively large power could substantially improve the performance of weak users who would otherwise suffer high error rates.

The base station (BS) usually has knowledge of the spreading codes of all users (MS) in a particular cell and can afford receivers with higher complexity for implementing joint multiuser equalization/detection schemes. Therefore, the present multiuser noise-predictive decision feedback equalization is a promising approach for joint equalization/ detection at the base station. The knowledge of the spreading codes can be used to aid fast convergence and/or retraining of the equalizers if necessary. This can be achieved by simply presetting the forward multiuser equalizer coefficients with the corresponding known spreading codes, or possibly by calculating the values of the multiuser linear equalizer coefficients using knowledge of the spreading codes, delays, powers and multipath profiles.

Multipath reception at the base station (BS) can be achieved by a RAKE receiver in combination with the despreaders followed by a multiuser noise-predictive decision feedback equalizer. In the case of fractional-chip spaced implementation of the joint equalization/detection receiver, multipath reception is inherently and automatically performed by the forward fractional-chip spaced multiuser equalizer. The multiuser equalizer then automatically gives the optimum combining of multipath components in the sense that it adapts to the MMSE solution. For convolutionally encoded data the problem of reliable delayed decisions from the path memory of the Viterbi decoders for decision feedback can efficiently be solved by choosing judiciously the parameters of the interleaver/deinterleaver pairs.

FIGS. 10A and B show an exemplary embodiment of the structure of a multivariate noise-predictive decision-feedback equalizer (MNP-DFE) for joint equalization/ detection of K=3 simultaneous users. The forward section 90 consists of a bank of K=3 fractional-chip spaced equalizers. The nine delay elements 92, of said forward section 90, provide for a delay of $T_c/q$. The coefficients of the multiuser equalizer are spaced at $T_c/q$ intervals, where q is a ratio of integers. The multivariate feedback predictor, see FIG. 10B, consists of a bank 91 of $K^2=9$ FIR (finite impulse response) T-spaced filters. Each of said T-spaced filters comprises two delay elements 93 providing for a delay T. The same Figures also show the error signals $e_{1i}(n)$ and $e_{2i}(n)$, i=1,2,3 which can be used for updating the forward multiuser linear equalizer coefficients and the multivariate feedback predictor coefficients, respectively.

An important feature of the MNP-DFE is that it allows interference prediction and subtraction not only in time but also in user order. Note that in a synchronous CDMA system, interference prediction takes place only in user order. In this case, the feedback multivariate predictor consists of K(K−1)/2 single-tap filters. This is also the case in an asynchronous CDMA system (see FIGS. 10A, 10B) if one assumes that only the rightmost column of coefficients in the bank of feedback filters 91 are present.

Figure 10B:
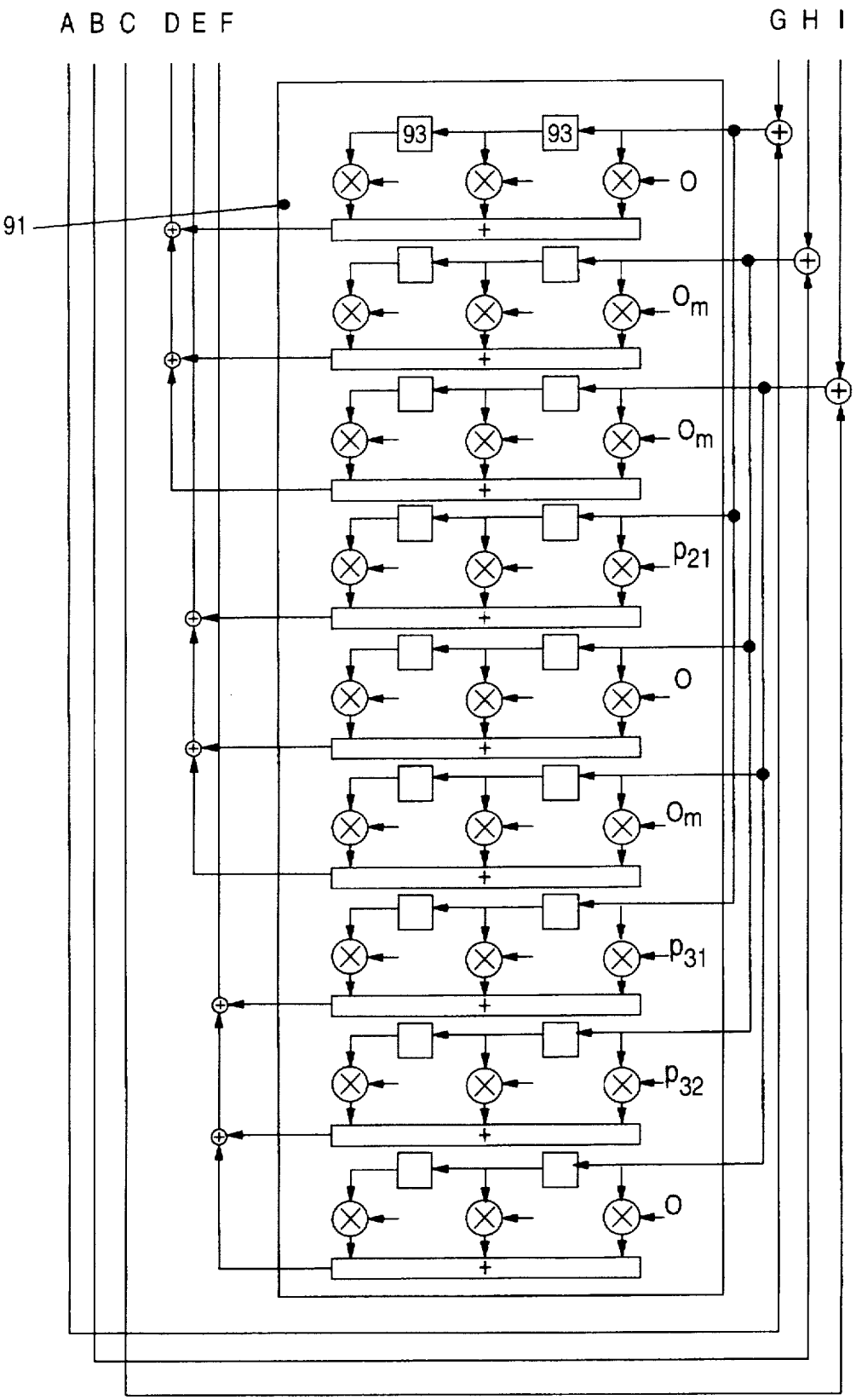

Except for the time 0 coefficients, all coefficients of the present MNP-DFE are adapted in a conventional manner, i.e., by use of techniques like the LMS algorithm. An example of how the time 0 coefficients are different is shown in FIGS. 10A, 10B for the detection over the user order 1,2, then 3. In this case, the only time 0 coefficients that are adapted are the prediction coefficients $p_{21}$, $p_{31}$, and $p_{32}$. The coefficients labelled 0 are always zero, whereas the coefficients labelled 0 m are presently zero, and only for this particular detection order. However, the last non-zero values are stored elsewhere so that they can be restored if there is an appropriate change in the order of the users. The determination of the user order can be based on estimations of various criteria among the users, such as received signal powers, or mean-square errors (MSEs) at the output of the bank of linear filters 91. In any case, the determined user order will likely change due to channel impairments such as fading or noise. Changes in user order are implemented by saving the current prediction coefficients and loading in a new set, corresponding to the new user order.

The present invention is also applicable in CDMA infrared (IR) networks. A CDMA based IR system is shown in FIG. 11. The mobile stations 110 are equipped with spreading circuitry 111 and opto-electronic transmission units 112. At the base station after photodetection, by means of an opto-electronic receiver 113, and spreading, carried out by despreaders 40, the signals of the different users are processed by an MNP-DFE 115 in order to reduce multiuser interference.

We claim:

1. An apparatus for reducing the multiuser-interference of input signals $\underline{x}(D)$ in a CDMA communication system, said apparatus comprising:

a multivariate predictor;

a decision quantizer;

a means for extracting interference signals $\underline{n}'(D)$, said interference signals $\underline{n}'(D)$ obtained from said input signals x(D) and from output signals $\hat{b}$ (D) from said decision quantizer; wherein said multivariate predictor operates on said interference signals $\underline{n}'(D)$ provided by the means for extracting interference signals with said multivariate predictor feeding its output signals $\underline{n}(D)$ into means for combining with said input signals x(D).

2. The apparatus of claim 1, further comprising a matrix of forward filters for a first interference reduction by filtering input signals x(D).

3. The apparatus of claim 1, further comprising a bank of fractional-chip spaced filters for a first interference reduction by filtering input signals x(D).

4. The apparatus of claim 1, wherein said means for generating interference signals subtracts said output signals $\hat{\underline{b}}$ (D) from said input signals x(D).

5. The apparatus of claim 1, wherein said multivariate predictor comprises a network of K×K T-spaced filters.

6. The apparatus of claim 5, wherein said multivariate predictor comprises a means for subtracting the multivariate predictor output signals $\hat{\underline{\eta}}$ (D), provided at the outputs of said network of K×K T-spaced filters, from said input signals x(D).

7. The apparatus of claim 2, wherein each forward filter of said matrix is either a zero-forcing (ZF) linear equalizer, or a minimum-mean-square error (MMSE) linear equalizer.

8. The apparatus of claim 1, wherein said decision quantizer is a Viterbi decoder for decoding convolutionally encoded data.

9. The apparatus of claim 1,2,3,4,5,6,7 or 8, further comprising a means for determining prediction errors $\underline{e}$(D) said prediction errors used for updating the prediction coefficients of said multivariate predictor.

10. The apparatus of claim 1 further comprising means to transmit and receive TDMA-based or FDMA-based traffic.

11. A method for reducing the multiuser-interference of input signals x(D) in a CDMA communication system, comprising the steps:

extracting interference signals $\underline{n}'$(D) from said input signals x(D) by using output signals $\hat{\underline{b}}$ (D) of a decision quantizer, generating multivariate predictor output signals $\hat{\underline{\eta}}$ (D) by taking said interference signals $\underline{n}'$(D) as inputs, and reducing the noise and residual interference signals of said input signals x(D) by subtracting said multivariate predictor output signals $\hat{\underline{\eta}}$ (D) from said input signals x(D).

12. The method of claim 11, wherein a first interference reduction step is carried out prior to the step of extracting interference signals $\underline{n}'$(D).

* * * * *